Sept. 23, 1969     F. W. STELLWAGEN     3,469,131
SYNCHRONOUS TIMER MOTORS
Filed April 5, 1968
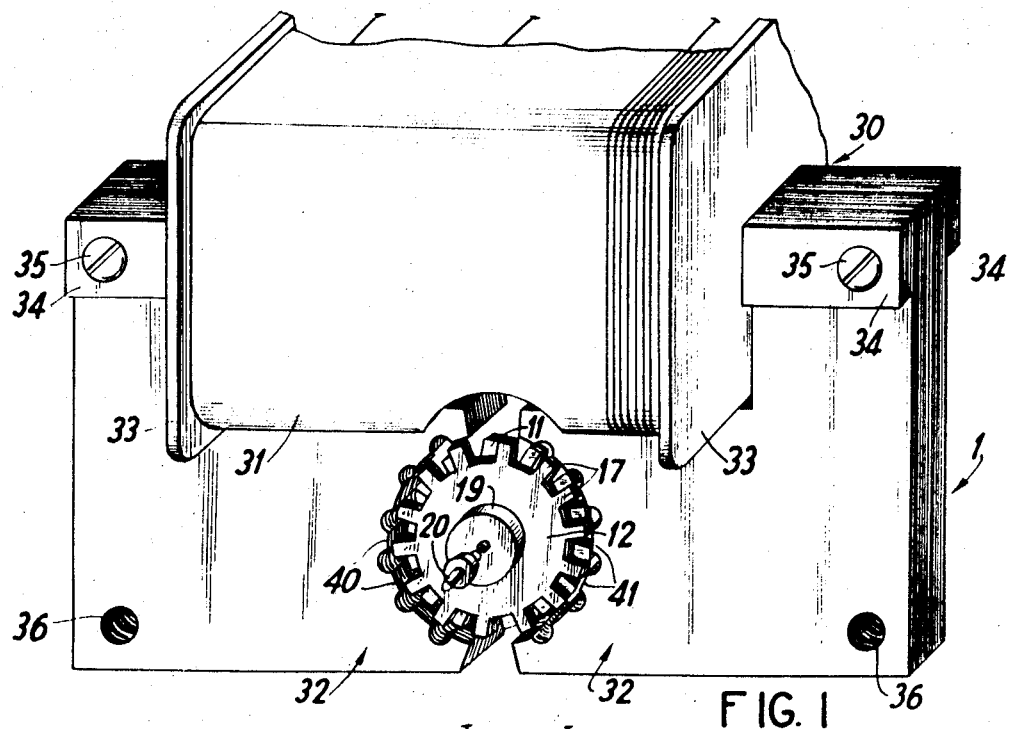
FIG. 1
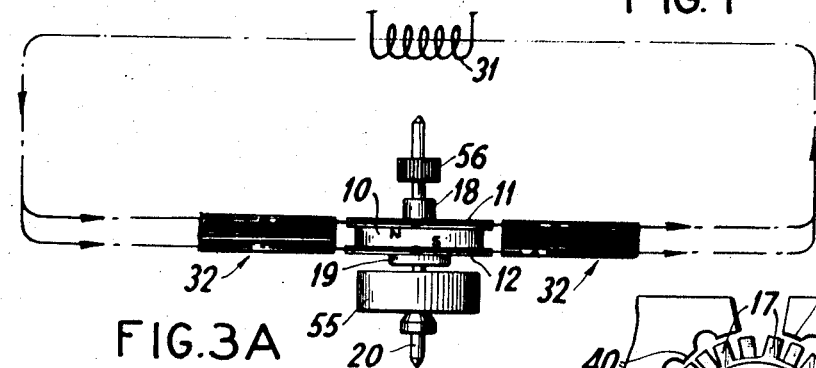
FIG. 3A
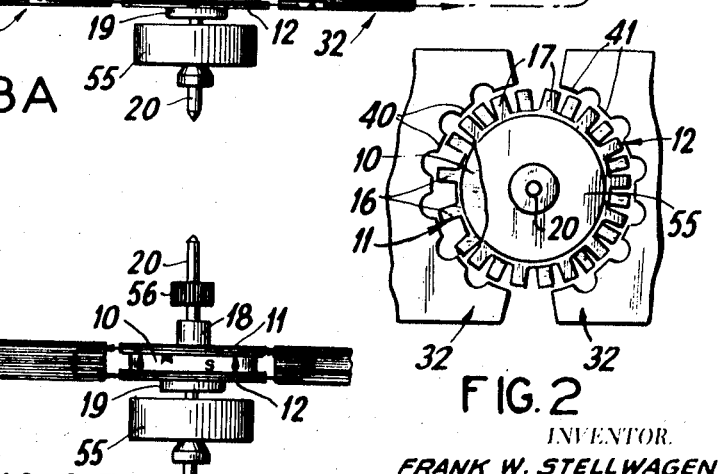
FIG. 2
FIG. 3B
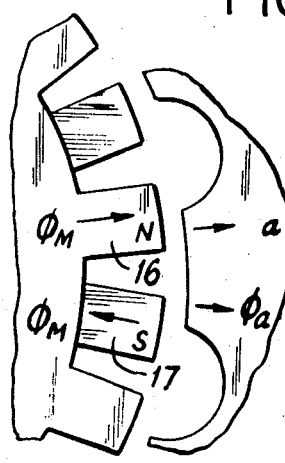
FIG. 4
INVENTOR.
FRANK W. STELLWAGEN
BY
Morgan, Finnegan, Durham & Pine
ATTORNEYS

United States Patent Office 3,469,131
Patented Sept. 23, 1969

3,469,131
SYNCHRONOUS TIMER MOTORS
Frank William Stellwagen, Stamford, Conn., assignor to General Time Corporation, Stamford, Conn., a corporation of Delaware
Filed Apr. 5, 1968, Ser. No. 719,125
Int. Cl. H02k 19/02, 21/08
U.S. Cl. 310—162                 20 Claims

ABSTRACT OF THE DISCLOSURE

Timer motor including a polarized rotating magnetic circuit arranged so that the energizing flux does not pass through the rotating permanent magnet. The portions of the stator and rotor forming the magnetic flux paths are constructed from a magnetic material having high permeability, high saturation flux density and high resistivity as well as a low hysteresis loss characteristics, such material being an iron-nickel alloy containing either silicon or molybdenum and being in the form of very thin laminations.

---

This invention relates to electric motors and, more particularly, to very inexpensive yet highly efficient synchronous timer motors. Although not limited thereto, the synchronous timer motors according to the invention are particularly useful in battery powered clocks.

Synchronous timer motors have been used extensively in electric clocks and other low torque timing applications. In construction, the prior timer motors, often referred to as clock motors, have approached the ultimate in simplicity. The stator normally includes an energizing winding in the form of a simple concentrically wound coil which surrounds part of a stamped magnetic circuit which distributes the magnetic flux in the desired pattern around the rotor. The rotor can be a simple notched disc, or a permanent magnetic disc polarized to have alternating north and south poles around its periphery. Because of the simple structure of these timer motors, they can be readily mass produced in large numbers and the costs per unit can be kept extremely low.

Unfortunately, the simple timer motors of the past have been notoriously inefficient. The efficiency of prior timer motors has normally been less than 1% (see, for example, "Alternating Current Machinery" by Bailey and Gault, McGraw-Hill, 1951, pp. 334–336) although, in some of the better grade timer motors, the efficiency has been as high as 2%.

In the years since the development of the transistor, battery (dry cell) powered clocks have been developed and have become quite popular. These clocks generally operate by sustaining the reciprocating or oscillatory motion of a balance wheel, tuning fork, pendulum, or the like which in turn mechanically drives the hands of the clock. With these reciprocating and oscillating mechanisms continuous operation for a year or more is achieved without changing or recharging batteries.

Athough the use of synchronous clock motors has been widely known for more than 50 years, these motors have not previously been used successfully in battery powered clocks. The use of prior synchronous clock motors was simply not considered feasible becaus of the known extremely low efficiencies of the motors. The known synchronous clock motors could not approach anything like one year's operation, on, for example, a single "D" size dry cell.

Even the far more expensive synchronous motors of the type including distributed windings could not be used successfully in battery powered clocks. With distributed windings there is a practical limitation as to the number of poles in the motor and, hence, when operating from available frequency sources, they rotate at relatively high speeds which are unacceptable in clocks because of excessive bearing wear and gear noise.

Thus, the more efficient motors with distributed windings were found prohibitively costly and unacceptable for a number of other reasons. The prior known and inexpensive synchronous clock motors were so notoriously inefficient that their use in a battery powered clock was virtually unthinkable.

Yet, a synchronous timer motor drive in a battery powered clock and the like eliminates the need for converting reciprocating motion into rotary motion and, therefore, has the potential of providing a simpler and better timepiece. Thus, an object of this invention is to provide a high efficient synchronous timer motor in which operating efficiencies of 40% or better can readily be achieved without significantly increasing the cost when compared to prior known inefficient clock motors. Another object is to provide a synchronous timer motor capable of driving a clock movement for more than one year on the power received from a conventional dry cell. Another object is to provide a synchronous motor capable of driving a clock movement which requires less than 200 microamperes when energized from a source between 1–1.5 volts.

In the motor according to the invention, the rotor comprises a permanent magnet sandwiched between a pair of notched discs to provide a rotating polarized circuit. The stator includes a simple coil and a magnetic stator circuit for distributing the magnetic flux to a plurality of distributed pole faces surrounding the rotor. Both the notched discs of the rotor and the magnetic circuit of the stator are made from a high permeability and high resistivity magnetic material.

The magnetic flux created by the permanent magnet has an additive effect tending to increase the flux density in the working air gap to thereby increase the motor torque which is approximately proportional to the square of the flux density. The motor structure is so arranged that the magnetic flux from the energizing coil, except for the working gap, passes only through materials having high permeability. In other words, the energizing magnetic flux does not pass through the permanent magnet which would otherwise cause substantial attenuation of the energizing flux due to the customary high reluctance of permanent magnet materials. As a result, the beneficial effect of the permanent magnet flux is utilized without adversely affecting the low reluctance path of the energizing flux.

The motor according to the invention is not significantly more complex than prior synchronous timer motors, and is not significantly more costly. The motor can easily include a large number of poles and, hence, can operate at the desired relatively low rotational speeds. The motor according to this invention has been found capable of continuously driving a clock movement for more than a year on a single "D" cell and of achieving and operat-efficiency of better than 40% under adverse conditions, the efficiency normally being in the range of 50% to 60%.

The manner in which the foregoing and other objects are achieved according to the invention is described more fully in the following specification which sets forth an illustrative embodiment. The drawings are part of the specification wherein:

FIGURE 1 is a perspective view illustrating the motor with the housing and rotor bearings removed;

FIGURE 2 is a plan view of the rotor and the surrounding portion of the stator structure;

FIGURES 3–A and 3–B illustrate, respectively, the magnetic paths for the AC energizing flux and the DC permanent magnet flux; and FIGURE 4 is an enlarged diagram illustrating the relationship between the fluxes passing through the rotor teeth and the adjacent pole faces of the stator.

The synchronous timer motor described in the illustrative embodiment is designed to operate on a 150 hertz supply and rotate at 600 r.p.m. (10 rotations per second). The rotor for this motor includes a permanent magnet 10 sandwiched between a pair of notched rotating discs 11 and 12, this assembly being arranged to provide a magnetized rotating circuit for the rotor. Each rotor disc is notched to provide 15 equally-spaced teeth to thereby form a 30-pole motor. The teeth are staggered so that when the rotor is viewed along the axis, as shown in FIGURE 2, the teeth 16 on one of the discs appear located between adjacent teeth 17 of the other disc.

Permanent magnet 10 and discs 11 and 12 are aligned on an arbor 20 between suitable bushings 18 and 19 and secured by an epoxy bond. Epoxy available under the trade name Bond Master M–645 (30 parts hardener to 100 parts resin) cured under pressure at a temperature of 300° F. has been found to provide satisfactory results.

The permanent magnet is preferably a barium ferrite material such as is available under the trade name Leyman IH Plastiform, which is relatively inexpensive in the sizes required for the rotor. The diameter of the permanent magnet is approximately the same as the diameter at the base of the rotor teeth. Permanent magnet 10 is magnetized after the rotor is assembled so that rotor disc 11 becomes a north pole and the disc 12 becomes a south pole. The magnetizing energy is controlled so that the open circuit leakage between discs 11 and 12 is approximately 100 gauss.

The stator for the motor includes a generally rectangular laminated core configuration having a leg 30 which passes through the center of an energizing winding 31 as well as pole pieces 32 which pass outside the coil and surround a generally circular opening which accommodates the rotor.

The energizing winding is concentrically wound about a rectangular nylon bobbin 33. Preferably, the winding is center tapped as can be achieved inexpensively through a bifilar winding technique. The length of the completed winding is approximately five times the radius of the winding in order to provide the lowest cost and copper loss. The winding is formed using 39 gage wire and includes 4,500 turns to provide an 880 ohm winding.

The cross-section of leg 30 of the stator core as it passes through the energizing winding has a square configuration as this provides a more efficient coupling relative to the winding. However, in other areas, the stator core need be no thicker than the thickness of the rotor plus a proper allowance for leakage flux. Therefore, to minimize the use of iron in the stator core to thereby reduce costs, the thickness of the stator in all areas other than leg 30 is determined by the leakage flux at a given section and the thickness of the rotor which is approximately .090 inch. Laminations 34 are added to the portion of the stator core passing through the energizing winding to build up the stator core thickness to a square cross-section which is .156 inch on a side.

As can be seen in FIGURE 1, there is relatively little spaced between the winding and the stator core as the latter passes around the outside of the winding. By so constructing the stator, the length of the stator magnetic path is minimized thereby reducing iron losses, and the quantity of iron required for construction of the stator is minimized thereby reducing costs.

The portion of the stator core passing outside the energizing coil 31 is separated to provide a permanent air gap in the magnetic circuit between pole pieces 32. This permanent air gap includes the generally circular opening which accommodates the rotor. The periphery of the opening is notched to provide stator pole faces 40 on one side of the opening and stator pole faces 41 on the other side, the angular displacement between adjacent pole face centers being 24° corresponding to the displacement of the 15 teeth on each of the rotor discs. As can be seen in FIGURES 1 and 2, there are seven stator pole faces on each side of the rotor. The stator pole faces 40 are placed symmetrically relative to the pole faces 41 so that if the teeth of the north pole rotor disc 11 are centered on pole faces 40 on one side of the rotor, the teeth of the south pole rotor disc 12 will be centered on stator pole faces 41 on the other side of the rotor.

When the motor is in operation there are two flux paths, one for the AC energizing coil flux, which is shown schematically in FIGURE 3-A, and the other for the DC permanent magnet flux, which is shown in FIGURE 3-B.

The AC flux is generated by energizing coil 31 and passes through the stator to the stator pole faces, across the air gap, through rotor discs 11 and 12, back across the air gap into the stator to complete the magnetic circuit back to the energizing coil. Significantly, although the rotor includes a permanent magnet, the AC energizing flux does not pass through the permanent magnet. Permanent magnets normally have a high reluctance and therefore substantial iron losses would result if it were necessary for the energizing flux to pass through the permanent magnet. As shown in FIGURE 3-A, the energizing flux passes through rotor discs 11 and 12 and thereby bypasses the permanent magnet.

The DC flux path is shown in FIGURE 3-B and goes from the north pole of permanent magnet 10, through the teeth of rotor disc 11, across the air gap and through the stator pole faces, back across the air gap and through the rotor disc 12 to the south pole of permanent magnet 10. As shown in FIGURE 2, the teeth of discs 11 and 12 are staggered, but are always sufficiently close to a pole face to complete a DC magnetic path. When the motor is rotating synchronously, the teeth are aligned with the stator pole faces generally as shown in FIGURE 2 when the AC energizing flux is maximum thereby providing maximum coupling between the teeth of discs 11 and 12 through an adjacent stator pole face at the instant of maximum torque generation.

The AC and DC magnetic fluxes combine to provide a substantially greater torque than could be achieved by either hysteresis or reluctance type motors. Since the motor torque is approximately proportional to the square of the flux density in the air gap, the additive effect is quite significant.

Consider first the fluxes during a half cycle when the AC flux $(\phi_a)$ is in the direction shown in FIGURE 4. In teeth 16 of the north pole rotor disc, the AC flux $(\phi_a)$ and the DC flux $(\phi_m)$ are additive and represented:

$$\phi_m + \phi_a \qquad (1)$$

whereas in the teeth 17, the DC flux $(\phi_m)$ is in the opposite direction and, therefore, the fluxes oppose one another which can be represented:

$$-\phi_m + \phi_a \qquad (2)$$

Since torque is aproximately proportional to the square of the flux density, the combined torque $T_1$ of a pair of rotor teeth 16, 17, is represented:

$$T_1 \alpha (\phi_m + \phi_a)^2 - (-\phi_m + \phi_a)^2 \qquad (3)$$

which can be multiplied out and simplified to:

$$T_1 \alpha 4 \phi_m \phi_a \qquad (4)$$

During the next half cycle of the AC flux, $(\phi_a)$, changes direction and, therefore, the torque $T_2$ during this half cycle is represented:

$$T_2 \alpha (\phi_m - \phi_a)^2 - (-\phi_m - \phi_a)^2 \qquad (5)$$

which can be multiplied out and simplified to become:

$$T_2 \alpha 4 \phi_m \phi_a \qquad (6)$$

Thus, the motor torque is approximately proportional to four times the product of the permanent magnet flux and the energizing flux. From this relationship, it should be noted that the torque increases in direct proportion to increases in the permanent magnetic flux. However, the saturation characteristics in the most confined portions of the magnetic paths (the rotor teeth and stator pole faces) limit the amount of torque multiplication which can be achieved by increasing the strength of the permanent magnet. It has been found desirable to design the motor to operate in a range not normally exceeding 50% of the permissible saturation flux density when the permanent magnet flux and peak AC energizing flux are combined. In the motor according to the invention, the permanent flux ($\phi_m$) is approximately ten times as great as the peak energizing flux ($\phi_a$) which, according to Equations 4 and 6 provide a motor torque approximately 40 times greater than could be achieved without the polarized magnetic rotating circuit.

The magnetic material for the stator circuit and the rotor discs 11 and 12 must be carefully selected.

The magnetic material must have a high permeability which, for the purposes of this specification, can be defined as being in excess of 20,000. High permeability magnetic materials are essential in order to keep the reluctance loss below 5% of the input power.

The magnetic material must also have a high saturation flux density so that a significant torque multiplication can be achieved through the use of the permanent magnet flux without requiring an abnormally large structure. For the purposes of this specification, high saturation flux densities are defined as saturation densities exceeding 10,000 gauss.

It is further essential that the magnetic material have a relatively small hysteresis loop so that the hysteresis losses at the motor operating frequency are maintained within bounds. For the purposes of this specification, a low hysteresis material can be defined as one in which the hysteresis loss is below 500 ergs/cc./cycle. Preferably, the magnetic material has a hysteresis loss below 300 ergs/cc./cycle.

An iron alloy magnetic material consisting of at least a 40% nickel content (by weight) has been found to provide a desired combination of high permeability and high saturation flux density as well as a low hysteresis loss. Preferably, the nickel content is maintained between 47–50%. Such materials have a permeability of approximately 50,000, a saturation flux density of 16,000 gauss and a hysteresis loss of aproximately 500 ergs/cc./cycle.

In an efficient dry cell powered synchronous motor, the eddy current losses must also be reduced to a minimum. To achieve this, the magnetic material is selected having a relatively high electrical resistivity which, for the purposes of this application, can be defined as a resistivity greater than 60 microhm-cm. Preferably, the resistivity is within the range of 75–90 microhm-cm. High resistivity is achieved in the magnetic material through the addition of silicon or molybdenum but the addition of silicon or molybdenum has been found to adversely affect the magnetic material's permeability and saturation flux density, while, on the other hand, having the desirable effect of reducing the hysteresis losses. Approximately 3% (by weight) of either molybdenum or silicon is found to increase the resistivity into the preferable range without precluding the high permeability for high saturation flux density characteristics of the material. The addition of approximately 3% silicon or molybdenum also has been found to reduce the hysteresis losses into the desirable range of below 300 ergs/cc./cycle.

Relatively thin laminations are utilized to further reduce eddy current losses. Iron-nickel alloy materials with a thickness of approximately six one-thousandths of an inch (0.006) can be produced at moderate cost and, hence, laminations of this thickness were selected for the motor in the illustrative embodiment.

The selection of relatively thin laminations on the order of six one-thousandths of an inch is significant for another reason. In the design of a motor, it is desirable to minimize the air gap. However, small air gap tolerances are usually achieved by resorting to more expensive machining and construction techniques, which are generally quite costly. For inexpensive timer motors, the rotor and stator laminations are preferably produced using stamping techniques. With thin laminations on the order of six one-thousandths of an inch, the stator and rotor laminations can be punched at moderate cost using high-speed progressive carbide dies while maintaining the maximum air gap within five one-thousandth of an inch (0.005). This is achieved in specifying suitable plus tolerances for the rotor discs and minus tolerances for the stator bore so that as the dies wear the air gap will be reduced and therefore the air gap never exceeds five-thousandth of an inch. Thus, by using very thin laminations not only are the eddy current losses reduced, but a small air gap can be achieved at moderate cost.

The laminations of the stator core on one side of the rotor are the same as those on the other side and, hence, can be made from the same stampings. Preferably, however, the lengths of the portions passing through the energizing coil are varied in length to provide a lap joint rather than a butt joint. The lap joint reduces reluctance of the magnetic path.

Considerable care must be taken to minimize stray power losses which arise when the flux density (B) becomes too high. The hysteresis loss is proportional to ($B^{1.6}$) and copper losses are generally proportional to ($B^2$). An undesirable high flux density (B) can occur if the permanent magnet flux is too high, or the size of the rotor teeth and stator pole faces too small. The wave shape of the motor energizing signal is also very significant. A sine wave source is preferable and a square wave source quite acceptable. However, wave forms having periodic spikes, such as those caused by switching transients, are very undesirable since they create disproportionately high stray losses.

The following data has been obtained for a motor constructed according to the invention with a ⅜ inch nominal rotor diameter, an air gap not exceeding five-thousandths of an inch, magnetic laminations six-thousandths of an inch and the magnetic material being an iron alloy including 47% (by weight) nickel and 3% (by weight) molybdenum. This magnetic material is found to have a permeability of 30,000, a resistivity of 90 microhm-cm., a saturation flux density of 11,000 gauss and a hysteresis loss of 250 ergs/cc./cycle. When energized from a 150 hertz sine wave source, the following characteristics were measured:

| E, volts | I, micro-amps | $W_{in}$, micro-watts | $W_{out}$, micro-watts | Efficiency, Percent |
| --- | --- | --- | --- | --- |
| .76 | 135 | 84 | 50 | 60 |
| .80 | 145 | 110 | 77 | 70 |
| .95 | 150 | 139 | 95 | 65 |

When the same motor was operated from a 150 hertz square wave source, the following characteristics were measured:

| E, D.C. volts | Microamps | $W_{in}$, micro-watts | $W_{out}$, micro-watts | Efficiency, Percent |
| --- | --- | --- | --- | --- |
| 1.2 | 440 | 529 | 275 | 52 |
| 1.5 | 545 | 816 | 355 | 43.6 |

While only one illustrative embodiment has been described in detail, it should be obvious that there are nu-

I claim:

1. A synchronous timer motor comprising:
   a polarized rotating magnetic structure including
      a pair of spaced-apart rotor discs each notched at their periphery to provide a like number of equally spaced rotor teeth, and
      a permanent magnet located between said discs and so polarized that one of said rotor discs becomes a north pole and the other becomes a south spole;
   a stator for the motor including
      a core providing pole pieces on opposite sides of said rotating magnetic circuit, each of said pole pieces being shaped to provide a plurality of pole faces spaced according to the spacing of said rotor teeth, and
      an energizing winding coupled to said core to provide an alternating energizing flux which passes only through said core, said rotor discs and the working air gap therebetween; and
   said rotor discs and said stator core being constructed from an iron alloy including at least 40% nickel by weight.

2. The motor according to claim 1 wherein said nickel content in said iron alloy is between 47% and 50%.

3. The motor according to claim 1 wherein said iron alloy further includes from 1% to 5% (by weight) of a material selected from the group consisting of: silicon and molybdenum.

4. The motor according to claim 1 wherein said iron alloy further includes approximately 3% (by weight) of a material selected from the group consisting of: silicon and molybdenum.

5. The motor according to claim 1 wherein said iron alloy includes (by weight) approximately 47% nickel and 3% molybdenum.

6. A synchronous timer motor comprising:
   a polarized rotating magnetic structure including
      a pair of spaced-apart rotor discs each notched at their periphery to provide a like number of equally spaced rotor teeth, and
      a permanent magnet located between said discs and so polarized that one of said rotor discs becomes a north pole and the other becomes a south pole;
   a stator for the motor including
      a core providing pole pieces on opposite sides of said rotating magnetic circuit, each of said pole pieces being shaped to provide a plurality of pole faces spaced according to the spacing of said rotor teeth, and
      an energizing winding coupled to said core to provide an alternating energizing flux which passes only through said core, said rotor discs and the working air gap therebetween; and
   said rotor discs and said stator core being laminated, high permeability, magnetic structures so arranged that the permanent magnet and energizing fluxes have low reluctance paths passing only through said high permeability, magnetic structures and said working air gap.

7. The motor according to claim 6 wherein said magnetic structure has a saturation density in excess of 10,000 gauss.

8. The motor according to claim 7 wherein said permanent magnet flux is approximately ten times greater than the peak energizing flux as said fluxes pass through the teeth of said rotor discs.

9. The motor according to claim 7 wherein the maximum flux density created by the combined permanent magnet and energizing fluxes is less than 50% of the magnetic structure saturation density.

10. The motor according to claim 6 wherein said magnetic structure has a resistivity greater than 60 microhm-cm.

11. The motor according to claim 10 wherein said magnetic structure has a resistivity in the range between 75–90 microhm-cm.

12. The motor according to claim 6 wherein said magnetic structure has a hysteresis loop of less than 500 ergs/cc./cycle.

13. The motor according to claim 12 wherein said magnetic structure has a hysteresis loop of less than 300 ergs/cc./cm.

14. The motor according to claim 6 wherein said laminated magnetic structure consists essentially of laminations no greater than 0.006 inch thick.

15. The motor according to claim 6 wherein said working air gap is less than 0.005 inch.

16. In an inexpensive, yet highly efficient, timer motor, the combination of,
   a concentrically wound energizing winding adapted to be energized from a controlled frequency AC source;
   a laminated stator core passing through the center of said energizing winding and shaped in a generally closed configuration providing pole pieces on opposite sides of a working air gap said air gap including a generally circular rotor opening;
   a pair of laminated, spaced-apart, rotor discs each notched about their periphery to provide a plurality of equally spaced rotor teeth;
   a disc shaped magnet between said rotor discs, said permanent magnet being polarized axially;
   an arbor, said rotor discs and permanent magnet being secured to said arbor with the rotor teeth of one of said rotor discs staggered relative to the rotor teeth of the other rotor disc;
   and wherein said laminated stator core and said laminated rotor discs are constructed from a magnetic material having the following characteristics:
      (a) permeability greater than 20,000,
      (b) saturation flux density exceeding 10,000 gauss,
      (c) hysteresis loss below 500 ergs/cc./cycle,
      (d) resistivity greater than 60 microhm-cm.

17. The motor according to claim 16 wherein said magnetic material is further characterized with a maximum lamination thickness of approximately 0.006 inch.

18. The motor according to claim 17 wherein the laminations for said stator core and said rotor discs are made by stamping from said magnetic material with a thickness of approximately 0.006 inch while maintaining an air gap between said rotor teeth and said stator of less than 0.005 inch.

19. The motor according to claim 16 wherein said magnetic material is characterized by a permeability of approximately 30,000, a saturation density of approximately 11,000 gauss, a hysteresis loss of approximately 250 ergs/cc./cycle and a resistivity of approximately 90 microhm-cm.

20. In an inexpensive timer motor, the combination of,
   a concentrically wound energizing winding adapted to be energized from a controlled frequency alternating source, the length of said winding being approximately five times the radius thereof;
   a laminated stator core having a substantially square cross-section as it passes through the center of said winding, said core being shaped to provide a pair of pole pieces on opposite sides of an air gap including a circular rotor opening, a plurality of pole faces being formed on each side of said rotor opening;
   a pair of laminated, spaced-apart, rotor discs each notched about their periphery to provide a plurality of equally spaced rotor teeth;
   a disc shaped magnet between said rotor discs, said permanent magnet being polarized axially;
   an arbor, said rotor discs and permanent magnet being secured to said arbor with the rotor teeth of one of said rotor discs staggered relative to the rotor teeth of the other rotor disc.

References Cited

UNITED STATES PATENTS

| | | | |
|---|---|---|---|
| 545,554 | 9/1895 | Thomson | 310—162 |
| 1,708,334 | 4/1929 | Spencer | 310—165 |
| 2,191,074 | 2/1940 | Herrington | 310—152 |
| 3,087,079 | 4/1963 | Scoles | 310—159 |
| 3,088,044 | 4/1963 | Goss | 310—162 |

WARREN E. RAY, Primary Examiner

R. SKUDY, Assistant Examiner

U.S. Cl. X.R.

310—156